United States Patent [19]

Sorimachi et al.

[11] Patent Number: 5,624,161
[45] Date of Patent: Apr. 29, 1997

[54] SEAT CUSHION PAD SUPPORTING CONSTRUCTION

[75] Inventors: Yuuichi Sorimachi; Wataru Itou; Yasushi Yoshino, all of Toyota; Teruhiko Yamamoto, Higashikamo, all of Japan

[73] Assignee: Takashimaya Nippatsu Kogyo Co., Ltd., Aichi-ken, Japan

[21] Appl. No.: 365,220

[22] Filed: Dec. 28, 1994

[30] Foreign Application Priority Data

| May 31, 1994 | [JP] | Japan | 6-118430 |
| Jul. 7, 1994 | [JP] | Japan | 6-155784 |
| Jul. 11, 1994 | [JP] | Japan | 6-158426 |
| Oct. 28, 1994 | [JP] | Japan | 6-265414 |

[51] Int. Cl.$^6$ ............................................. A47C 7/35
[52] U.S. Cl. .................... 297/452.52; 297/452.49; 267/112; 267/142
[58] Field of Search ................ 297/452.49, 452.52; 267/112, 131, 133, 142, 97

[56] References Cited

U.S. PATENT DOCUMENTS

| 2,158,441 | 5/1939 | Thum . | |
| 2,833,339 | 5/1958 | Liljengren et al. . | |
| 2,982,342 | 5/1961 | Liljengren et al. . | |
| 3,610,688 | 10/1971 | Arnold | 297/452.49 |
| 3,667,749 | 6/1972 | Platt et al. | 267/112 |
| 3,860,287 | 1/1975 | Platt . | |
| 3,880,467 | 4/1975 | Tischler . | |
| 3,998,371 | 12/1976 | Tieman | 297/452.52 X |
| 4,231,615 | 11/1980 | Griffiths . | |
| 5,088,793 | 2/1992 | Mithuhiro | 297/452.52 |

FOREIGN PATENT DOCUMENTS

| 973420 | 3/1960 | Germany . |
| 1654237 | 8/1972 | Germany . |
| 3909221 | 10/1990 | Germany . |
| 4128954 | 6/1993 | Germany . |
| 47-1879 | 1/1972 | Japan . |
| 50-25366 | 3/1975 | Japan . |
| 52-12005 | 1/1977 | Japan . |
| 56-36261 | 4/1981 | Japan . |
| 62-42453 | 3/1987 | Japan . |
| 62-107752 | 7/1987 | Japan . |
| 2-31531 | 2/1990 | Japan . |

Primary Examiner—Peter R. Brown
Attorney, Agent, or Firm—Oliff & Berridge

[57] ABSTRACT

A seat cushion pad supporting construction has a base frame having an opening, and a planar spring deck disposed substantially over the opening. The planar spring deck is formed of a rectangular boundary frame and flexible support members extending front-to-rear between front and rear boundary frame portions of the boundary frame. The flexible support members may be spring steel wires or flexible planar members made of synthetic resin, rubber or fabric. The spring deck is non-resiliently connected at its front boundary frame portion to a front portion of the base frame adjacent the opening to be vertically pivotable with respect to the front base frame portion. The rear boundary frame portion is resiliently connected by tension springs to a rear portion of the base frame adjacent the opening. Optional front and side protruding spring frames are connected to the boundary frame to support the upper legs of an occupant. An optional pivotable linking mechanism supports the front boundary frame portion so that the portion is vertically pivotable with respect to the front base frame portion.

28 Claims, 16 Drawing Sheets

SEAT CUSHION PAD SUPPORTING CONSTRUCTION

BACKGROUND OF THE INVENTION

1. Field of the Invention

The present invention relates to a seat cushion pad supporting construction and, more particularly, to a seat cushion pad supporting construction for, for example, a vehicle seat, which provides seating comfort despite a comparatively thin cushion pad disposed on the supporting construction.

2. Description of the Related Art

A known vehicle seat cushion pad supporting construction comprises a spring deck disposed in or over an opening of a seat cushion base frame and tension springs resiliently connecting the spring deck to the seat cushion base frame. This type of cushion pad supporting construction employing a spring deck is widely used because the cushioning performance of the construction allows use of a relatively thin cushion pad.

Japanese utility model application unexamined publication No. 62-42453 and Japanese utility model application unexamined publication No. 2-31531 disclose vehicle seat cushion supporting constructions. Each construction employs a planar spring deck that includes a generally rectangular boundary frame and a plurality of spring steel wires extending between the right and left side frame portions of the boundary frame. The spring deck is resiliently connected at its right and left side frame portions to the seat cushion base frame by a plurality of tension springs. Although these constructions provide a high degree of static seating comfort, they fail to provide dynamic seating comfort and, particularly, a high degree of seating surface stability under dynamic conditions. For example, the prior constructions fail to provide comfort where substantial vibration, such as pitching or rolling, of the vehicle body changes the load exerted on the seat cushion from the occupant or shifts the center of gravity of the occupant relative to the planar spring deck. In addition, because the spring steel wires extend in the right-to-left directions, the load of an occupant sitting on the seat is unevenly distributed to the spring steel wires; normally, rearwardly-disposed spring steel wires receive larger loads than forwardly-disposed spring steel wires. As a result, rearward portions of the side frame portions receive a large force, and the elastic deformation of the boundary frame is likely to become significantly large. Further, such uneven distribution of load over the spring deck results in high seating surface pressure. Therefore, a relatively thick cushion pad is required to achieve a desirable cushioning performance despite the high seating pressure.

U.S. Pat. No. 3,860,287 discloses a seating construction incorporating a spring deck member including a three-dimensional border strand whose right and left side strand portions are raised higher than front and rear strand portions. Spring steel wires extend between front and rear strand portions of the border strand. While the rear portion of the spring deck is resiliently connected to a rear rail of a seat cushion base frame by means of, for example, tension springs, the front frame portion thereof is rigidly fixed to or connected pivotably (in a substantially vertical direction) to a front rail of the seat cushion base frame. Similar to the above-described constructions, although this construction provides good static seating comfort it fails to provide good seating surface stability under dynamic conditions. More specifically, when the body of an occupant is swung side-to-side during turning or rolling of the vehicle, the raised side frame portions of the boundary frame alternately receive increased loads and thereby elastically bend. Along with elastic deformation of the side frame portions of the boundary frame, the rear frame portion of the boundary frame also bends elastically, thus deforming and twisting a central seating portion of the spring deck.

Japanese Utility model unexamined application Publication 56-36261 discloses another seat cushion supporting construction employing a spring deck comprising a generally rectangular frame. Each of a plurality of frame cords is connected at one end to a front portion of the frame and, at the other end, to a rear portion of the frame. The front portion is rigidly connected to hooks that are fastened to a front of a seat frame. The rear portion of the frame is connected by coil springs to the rear of the seat frame. However, there is no disclosure for the prevention of twisting movement of the frame and, in particular, a rear portion of the frame, which occurs under dynamic seating conditions. Moreover, there is no provision for a rear frame member that includes a rigidity that resists bending during application of a load.

Japanese utility model application unexamined publication No. 2-31531 discloses yet another seat cushion supporting construction employing a spring deck that includes spring steel wires extending in right-to-left directions in the boundary frame. The spring deck is resiliently connected at its rear edge to a seat cushion base frame and is non-resiliently connected at its front edge to the seat cushion base frame by a plurality of hooks. However, because the hooks do not sufficiently restrict the front edge of the spring deck from moving right-to-left or from rolling about a front-to-rear axis, this construction fails to provide good seating surface stability under dynamic conditions.

SUMMARY OF THE INVENTION

The present invention is intended to solve the above-stated problems. It is an object of the present invention to provide a seat cushion pad supporting construction that achieves uniformly distributed seating surface pressure, good cushioning performance and high seating surface stability under dynamic conditions, so as to provide its occupant with high static and dynamic seating comfort, even if a relatively thin cushion pad is used.

Another object of the present invention is to provide a seat cushion pad supporting construction that achieves uniformly distributed seating surface pressure, good cushioning performance, high seating surface stability despite motions of the vehicle and further, to provide good occupant-holding performance during, for example, cornering, and improved cushioning performance with respect to the upper legs of, for example, a driver during pedal operation, so as to provide its occupant with high static and dynamic seating comfort, even if a relatively thin cushion pad is used.

Still another object of the present invention is to provide a seat cushion pad supporting construction that achieves uniformly distributed seating surface pressure, further improved cushioning performance under severe road conditions, high seating surface stability despite motions of the vehicle and, further, good occupant-holding performance during, for example, cornering, and good cushioning performance with respect to the occupant's upper legs during pedal operation, so as to provide its occupant with high static and dynamic seating comfort even if a relatively thin cushion pad is used.

According to a first aspect of the present invention, there is provided a seat cushion pad supporting construction including a seat cushion base frame having an opening, and a generally planar spring deck disposed substantially over the opening. The spring deck includes a boundary frame and flexible support means connected between a front portion of the seat cushion pad supporting construction and a rear frame boundary portion of the boundary frame. The rear-boundary portion has a rigidity that substantially prevents deformation during application of a load. The seat cushion pad supporting construction further includes non-resilient connecting means or a device for non-resiliently connecting the front boundary frame portion of the boundary frame to a front portion of the seat cushion base frame adjacent the opening to substantially prevent the front boundary frame portion of the boundary frame from moving at least in right-to-left directions and rolling about axes extending substantially in up-and-down directions and the fore-to-aft directions, relative to the seat cushion base frame. Resilient connecting means or a device is provided for resiliently connecting the rear boundary frame portion of the boundary frame to a rear portion of the seat cushion base frame adjacent the opening so that at least a rear portion of the planar spring deck is shiftable up and down.

According to a second aspect the present invention, there is provided a seat cushion support including a base frame having an opening and a spring deck having flexible support members connected to front and rear frame portions of a spring deck boundary frame, the front and rear frame portions being connected to side frame members. A rigidity of the rear frame portion is at least equal to a rigidity of the front and side frame portions. The spring deck is connected to the base frame such that the spring deck can be pivoted about the front frame portion while substantially preventing the boundary frame from relative lateral movement and twisting about fore-to-aft and up-and-down axes with respect to the base frame.

According to a third aspect of the present invention, there is provided a support structure for a seat cushion including an outer frame, an inner frame having at least one frame portion pivotably connected to a front portion of the outer frame, the inner frame also having a rear frame portion mounted for substantial up-and-down movement with respect to a rear portion of the outer frame, support members extending from the rear frame portion toward the front portion of the outer frame, and means or a device for substantially preventing deformation of the rear frame portion during application of a load.

In the above-described seat cushion pad supporting construction, the rear boundary frame portion of the boundary frame may be a separate member that is connected to side boundary frame portions of the boundary frame and has a greater rigidity than the other portions of the boundary frame.

The flexible support means includes spring steel wires or at least one flexible member made of resin or fabric. The non-resilient connecting means may pivotably support the front boundary frame portion. The resilient connecting means may include tension springs.

The above-described seat cushion pad supporting construction is mounted in, for example, a motor vehicle, by connecting the seat cushion base frame to the compartment floor, and a thin cushion pad is mounted over the planar spring deck. The planar spring deck compensates for the insufficient cushioning performance of the thin cushion pad to provide static seating comfort, as in conventional seat cushion pad supporting construction. According to the present invention, because the flexible support means is connected to a front portion of the seat cushion pad supporting construction, for example, the front boundary frame portion, and the rear boundary frame portion, that is, it simply extends or is stretched front-to-rear, the load from an occupant is transmitted uniformly or symmetrically via the flexible support means to substantially the entire length of the front and rear boundary frame portions. The front boundary frame portion resists bending owing to the support by the non-resilient connecting means, and the rear boundary frame portion also resists bending because it has great rigidity. As a result, the seating surface pressure is substantially uniformly distributed over the flexible support means of the planar spring deck.

Further, because side boundary frame portions have substantial rigidity and are braced between the front and rear boundary frame portions, the combination of the front and rear boundary frame portions and the side boundary frame portions prevents an excessive amount of deformation of the boundary frame. Further, because the planar spring deck is non-resiliently connected at its front boundary frame portion to the seat cushion base frame and resiliently connected at its rear boundary frame portion to the seat cushion base frame, at least a rearward portion of the planar spring deck yields or pivots downward when receiving a seating load. Thus, the combination of the elasticity of the resilient connecting means, such as tension springs, and the elasticity of the planar spring deck achieves good cushioning performance. Furthermore, because the boundary frame of the planar spring deck has a substantially high rigidity as well, the right-hand and left-hand boundary frame portions prevent excessive or undesired elastic deformation of the boundary frame, thus achieving a high degree of seating surface stability.

In addition, the seat cushion pad supporting construction may further include protruding spring frame means extending from the boundary frame of the planar spring deck. The protruding spring frame means includes a front protruding spring frame having a top portion positioned upward from the front boundary frame portion of the boundary frame, and/or side protruding spring frames each having a portion positioned outwardly upwards and sideways from the respective side boundary frame portions of the boundary frame.

As described above, the seat cushion pad supporting construction is mounted in, for example, a motor vehicle, by connecting the seat cushion base frame to the compartment floor, and a thin cushion pad is mounted over the seating surface supporting spring member that includes the planar spring deck member and the front protruding spring frame, so that a front edge portion of the cushion pad is supported by the front protruding spring frame. In addition to the advantages achieved using a spring deck alone, this construction achieves the following advantages. Because the top portion of the front protruding spring frame transversely extends higher than the front portion of the planar spring deck portion, the front protruding frame portion elastically deforms to provide good cushioning and supporting performance when the front edge of the cushion pad is pressed downward by the driver's upper legs during pedal operation. Furthermore, the side protruding spring frames will firmly hold the occupant's upper leg during, for example, cornering. Although the load is naturally transmitted from the front and/or side protruding spring frames to the boundary frame of the planar spring deck and may elastically deform the boundary frame, the side boundary frame portions of the boundary frame prevent excessive elastic or permanent deformation of the planar spring deck. The interconnection between the front and side protruding spring frames and the boundary frame helps disperse a load exerted on a given frame portion over the entire framework, preventing the frame portion from excessively deforming.

Furthermore, the non-resilient connecting means of the seat cushion pad supporting construction may include linking means connected pivotably in a substantially vertical direction at its front end to the front portion of the cushion seat base frame adjacent the opening. The rear end of the linking means is correspondingly pivotably connected to the front boundary frame portion of the boundary frame. Accordingly, the front boundary frame portion is substantially vertically pivotable with respect to the front portion of the seat cushion base frame adjacent the opening. The resilient connecting means urges the planar spring deck rearward. This construction may further comprise protruding frame portions as in the construction described above.

In addition to the advantages achieved by a spring deck alone the provision of linking means achieves the following advantages. Because the planar spring deck is connected at its front portion to the seat cushion base frame by linking means vertically pivotable with respect to the front frame portion of the planar spring deck and the front portion of the seat cushion base frame while being constantly urged to the rear by the resilient connecting means, the entire seating surface supporting spring member is lowered when receiving the seating load from an occupant. This increased cushion stroke achieves extra shock absorbing, excellent dynamic seating comfort and substantially eliminates bottom-hitting events, i.e., a situation where the planar spring deck or the seat cushion as a whole reaches its cushioning limit, even under severe road conditions.

BRIEF DESCRIPTION OF THE DRAWINGS

Further objects, features and advantages of the present invention will become apparent from the following description of preferred embodiments with reference to the attached drawings, wherein.

In the figures, like numerals are employed to denote like components or parts.

DETAILED DESCRIPTION OF PREFERRED EMBODIMENTS

Embodiment 1

Embodiment 1 of the present invention will be described with reference to FIGS. 1 to 3.

Figure 1:
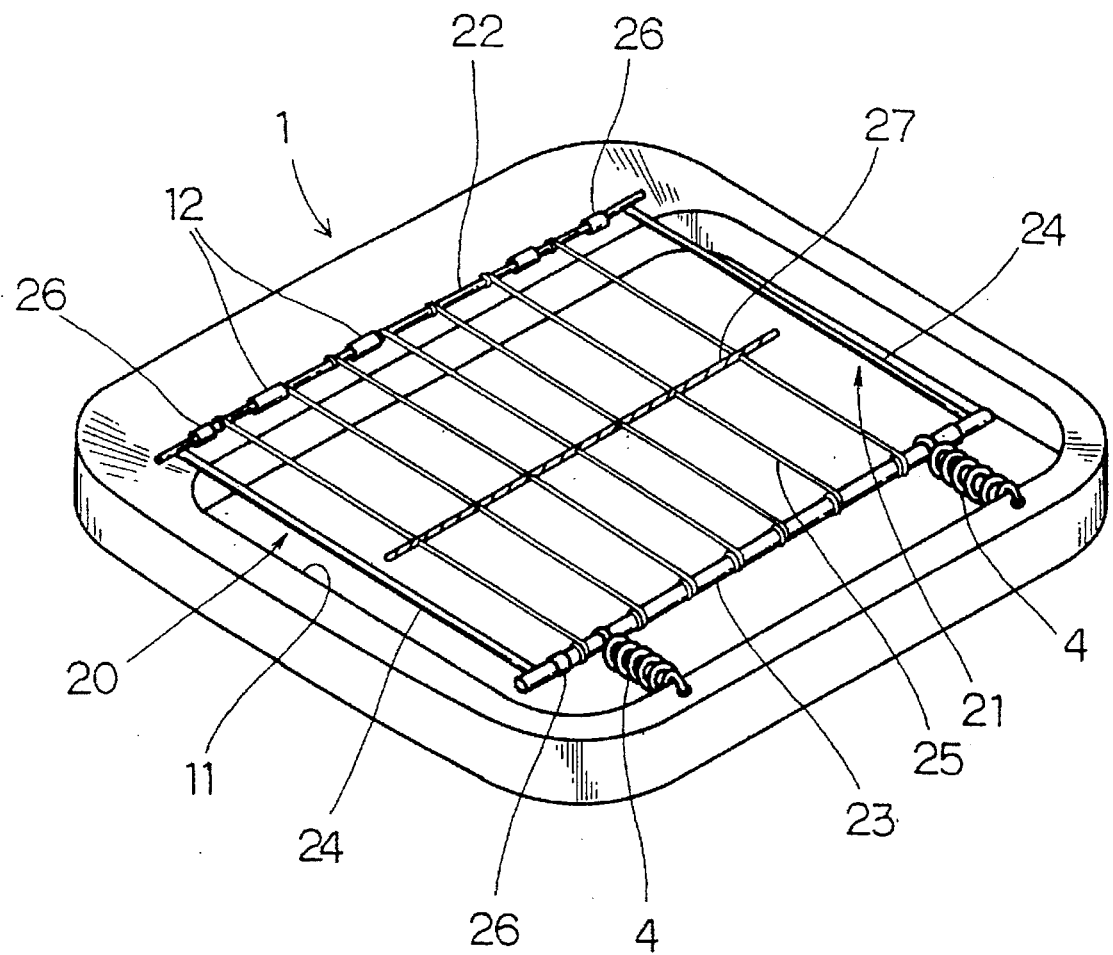
FIG. 1 a perspective view of Embodiment 1 of the seat cushion pad supporting construction of the present invention.

Referring to FIG. 1, a seat cushion pad supporting construction according to Embodiment 1 comprises a seat cushion base frame 1 having an opening 11 and a planar spring deck 20 connected to the seat cushion base frame 1 so as to lie over the opening 11. The planar spring deck 20 comprises a generally rectangular boundary frame 21 having a front boundary frame portion 22, a rear boundary frame portion 23, side boundary frame portions 24 and a plurality of wires, for example, spring steel wires 25, which simply extend or are stretched front-to-rear between the front and rear boundary frame portions 22, 23. The ends of the spring steel wires 25 are connected to or knotted around the front or rear boundary frame portions 22 or 23 by a known method, such as Pullmaflex® or Kontour Mat®. Preferably, five to eight wires 25 are spaced about 50–60 mm. A spacer cord 27 extends across substantially middle portions of the wires 25. At the intersections, the spacer cord or member 27 is connected to, for example, pierced by, the wires 25, thereby maintaining uniform spacing between the wires 25. The cord member 27 may be formed of a plastic pipe or a twisted paper strand or the like.

The rectangular boundary frame 21 is formed of a wire, such as a hard-drawn steel wire having a diameter of 2–8 mm, so as to have predetermined elasticity and rigidity. The rigidity thereof is greater than that of the spring steel wires 25. The front boundary frame portion 22, the rear boundary frame portion 23 and the side boundary frame portions 24 of the rectangular boundary frame 21 may be formed either by bending a single wire or by connecting separate wires having different diameters, as long as the rear boundary frame portion 23 has a rigidity equivalent to or greater than a rigidity of a hard-drawn steel wire of about 5 mm in diameter so as to prevent excessive bending of the rear boundary frame portion 23.

In the rectangular boundary frame 21 shown in FIG. 3, the front and side boundary frame portions 22 and 24 are formed of relatively thin hard-drawn steel wires having a diameter of, for example, 3.2 mm, and the rear boundary frame portion 23 is formed of a relatively thick hard-drawn steel wire having a diameter of, for example, 5 mm. The front boundary frame portion 22, if made of a hard-drawn steel wire, may be as thin as 2 mm in diameter. The front boundary frame portion 22, the rear boundary frame portion 23 and the side boundary frame portions 24 are connected by connecting clamps 26 although they may be connected by welding. The relative reduction of the rigidity of the side boundary frame portions 24 improves the cushioning performance of the planar spring deck 20.

The thus-formed planar spring deck 20 is non-resiliently, that is, rigidly or pivotably connected at the front boundary frame portion 22 using connector members 12, such as hooks, which are rigidly fixed to or formed in a front portion of the seat cushion base frame 1 adjacent the opening 11. The non-resilient connection between the front boundary frame portion 22 and the connector members 12 is made so as to substantially restrict the front boundary frame portion 22 from moving at least in the vertical, fore-to-aft and right-to-left directions. The planar spring deck 20 is urged rearward by two tension springs 4, each of which is connected at its front end to the rear boundary frame portion 23 and at its rear end to a rear portion of the seat cushion base frame 1 adjacent the opening 11. The two tension springs 4 are disposed generally symmetrically about a fore-to-aft axis of the planar spring deck 20.

Thus, at least a rear portion of the planar spring deck 20 is movable up and down relative to the seat cushion base frame 1 owing to the elasticity of the tension springs 4 and the elasticity of the side boundary frame portions 24 and, optionally, the pivotable connection of the front boundary frame portion 22 by means of the connector members 12.

Figure 2:
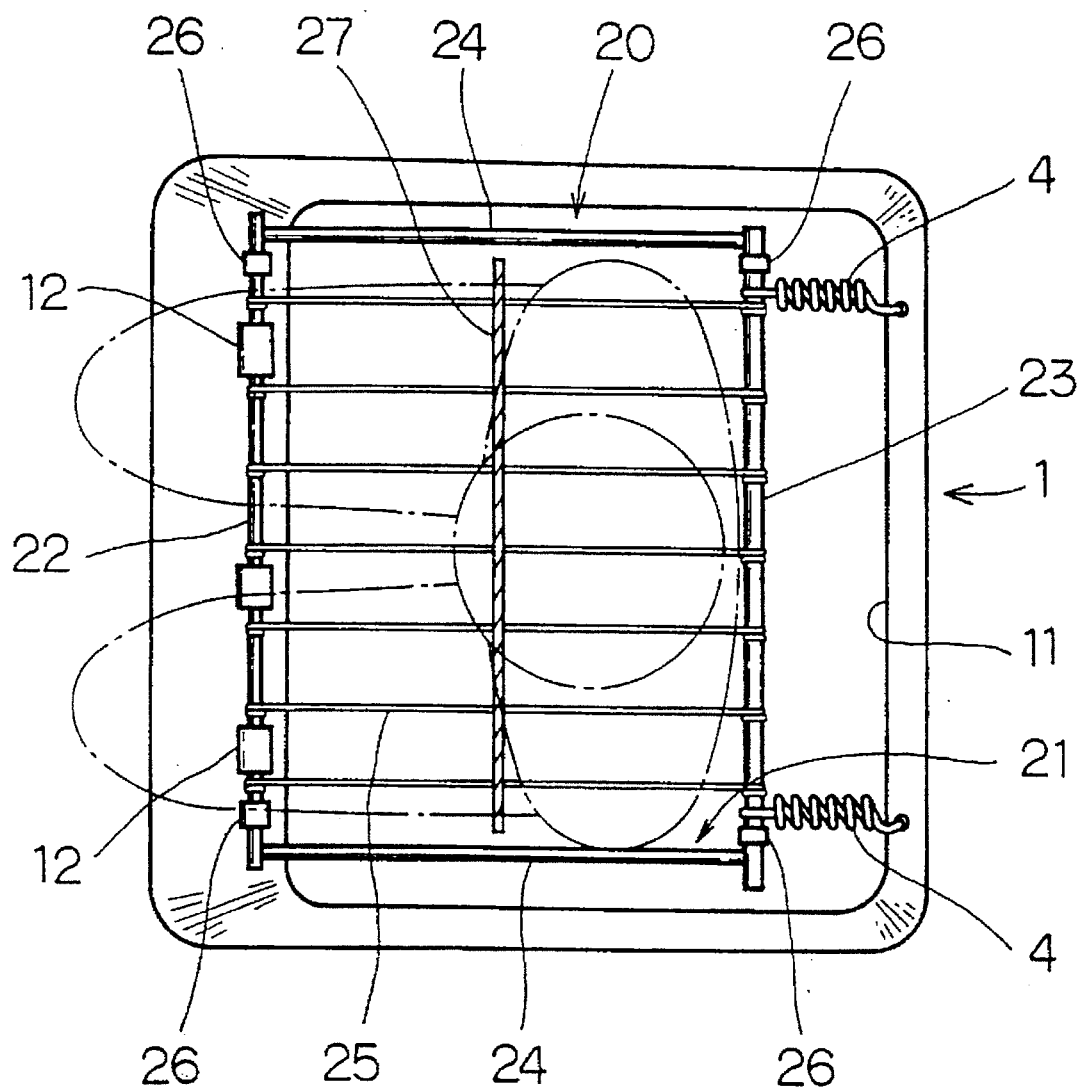
FIG. 2 a top plan view of Embodiment 1 with an illustration of an occupant sitting thereon.

In operation, when a person sits on a seat comprising the above-described seat cushion pad supporting construction and a cushion pad laid over the planar spring deck 20, the person's hip is positioned over rearward portions of substantially all the longitudinally extending spring wires 25 of the planar spring deck 20 as shown in FIG. 2. Thus the spring wires 25 are substantially equally loaded, compared with a conventional spring deck comprising transversely extending spring steel wires. The load is transmitted from the spring steel wires 25 to the front boundary frame portion 22, which is non-resiliently connected to the seat cushion base frame 1, and the rear boundary frame portion 23, which is resiliently connected to the seat cushion base frame 1 by the tension springs 4, thus practically pivoting the planar spring deck 20 downward. Therefore, load or shock is uniformly distributed over the planar spring deck 20 and cushioned by the elasticity of the spring steel wires 25, the tension springs 4, the rear boundary frame portion 23 and the side boundary frame portions 24. Thus, a seat employing the seat cushion pad supporting construction according to this embodiment provides excellent seating comfort even if the seat employs a thin cushion pad.

Figure 3A:
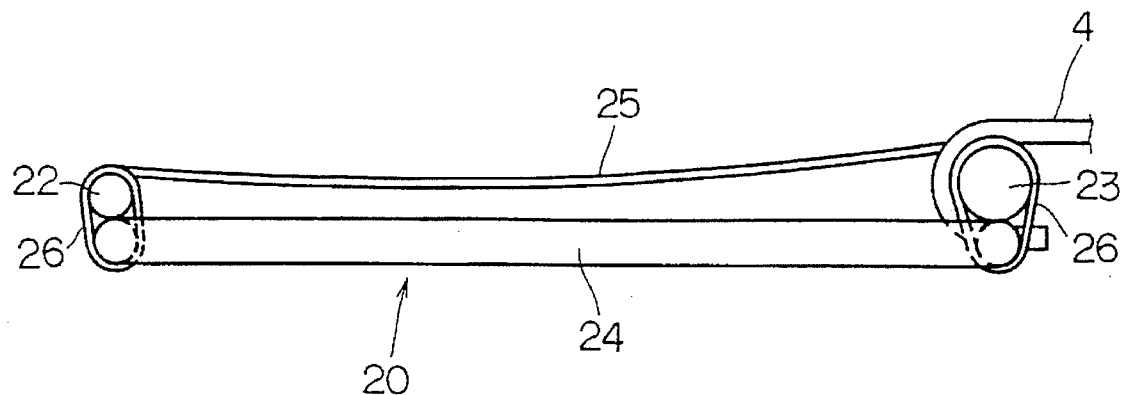
FIGS. 3A and 3B are enlarged fragmentary side views of Embodiment 1, illustrating how a planar spring deck yields when receiving load from an occupant.
Figure 3B:
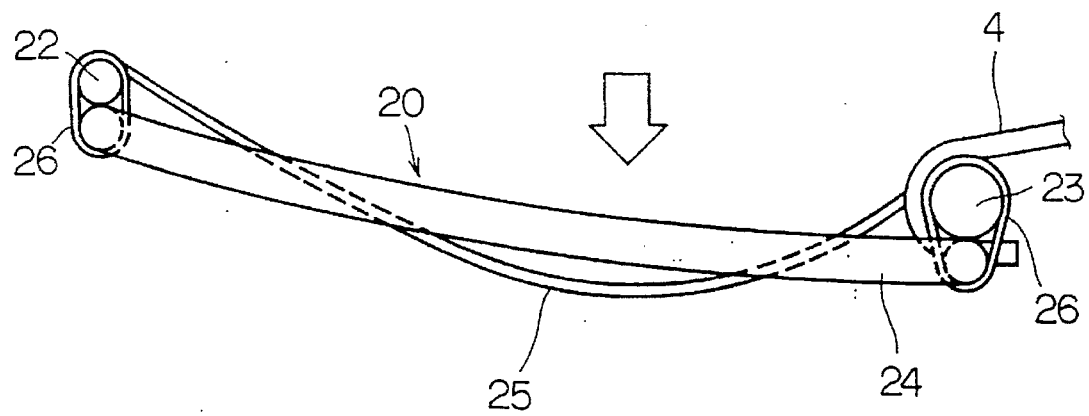

The operation of the seat cushion pad supporting construction according to this embodiment will be more specifically described with reference to FIGS. 3A and 3B. When a seat receives an occupant, the spring steel wires 25 curve downward. If the load is large, the rear boundary frame portion 23 slightly bends or arches diagonally down and forward because the rear boundary frame portion 23 is pulled by the spring steel wires 25 in the above-mentioned direction while it is supported near its ends by the tension springs 4. However, because the rear boundary frame portion 23 has a great rigidity and because the side boundary frame portions 24 serve as braces between the front and rear boundary frame portions 22, 23, the deformation of the rear frame portion is substantially prevented and excessive bending of the rear boundary frame portion 23 can be prevented. In addition or as an alternative, an independent member could be provided to substantially prevent deformation of the rear frame portion. For example, a reinforcement, stiffener, a splint, or a strengthener could be provided adjacent or in surrounding relation to the rear frame portion to add rigidity to the rear frame portion. Thus, the planar spring deck 20 forms a bowl-like shape with the boundary frame 21 substantially maintaining its original rectangular shape to provide a stable seating surface.

During vehicle operation, the center of gravity of the occupant's body shifts in various directions relative to the seat cushion base frame 1. In response to substantially vertical shifting, at least a rear portion of the planar spring deck 20 moves vertically while the entire planar spring deck 20 makes substantially no right-to-left or fore-to-aft motions because of the above-described non-resilient connection of the front boundary frame portion 22 to the seat cushion base frame 1. Good cushioning performance is thus achieved without right-to-left or fore-to-aft shifting. Furthermore, if the center of gravity of the occupant's body shifts right or left, the planar spring deck 20 including the rectangular boundary frame 21 is deformed or twisted while being downwardly displaced. However, because the side boundary frame portions 24 serve as braces as described above, significant deformation of the planar spring deck 20 is prevented. Naturally, elastic restoration force of the deformed planar spring deck 20 will bring the planar spring deck 20 back to its normal shape. Thus, the seating pad supporting construction according to this embodiment provides a very stable seating surface and thus helps the occupant keep desired sitting posture even during cornering or the like. In addition, if the occupant's body shifts forward or rearward, the planar spring deck 20 will not substantially shift in the forward or rearward directions because of the non-resilient connection of the front boundary frame portion 22 to the seat cushion base frame 1, thus providing a stable seating surface.

As described above, the seat cushion pad supporting construction according to this embodiment achieves good cushioning performance and seating surface stability under both static and dynamic conditions, thus enabling use of a relatively thin cushion pad without sacrificing seating comfort.

Embodiment 2

Embodiment 2 of the present invention will be described with reference to FIGS. 4 to 7.

Figure 4:
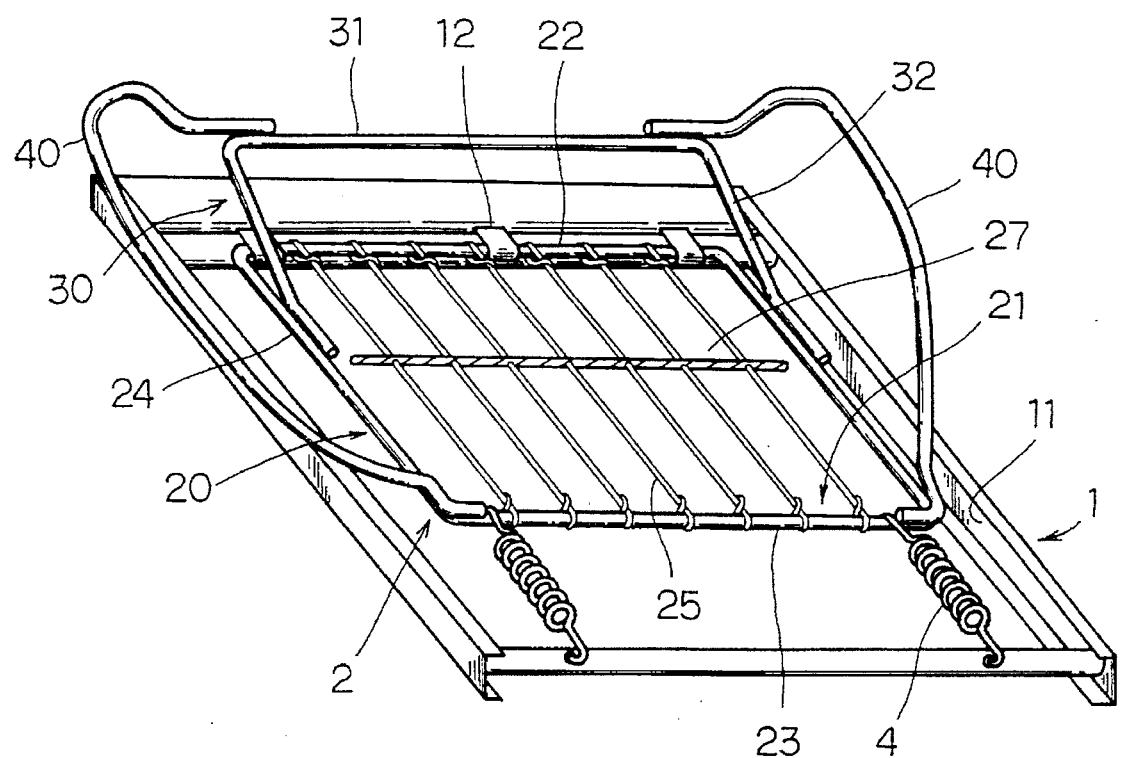
FIG. 4 is a perspective view of Embodiment 2 of the seat cushion pad supporting construction of the present invention.

Referring to FIG. 4, this embodiment is constructed substantially in the same manner as Embodiment 1, except that a seating surface supporting spring framework 2 of a seat cushion pad supporting construction according to Embodiment 2 has a bucket shape, comprising a planar spring deck 20, a front protruding spring frame 30 and side protruding spring frames 40 that are connected to a generally rectangular boundary frame 21 of the planar spring deck 20.

The front protruding spring frame 30 has a top portion 31 transversely extending substantially parallel to the front boundary frame portion 22 of the planar spring deck 20 and leg portions 32 extending from the ends of the top portion 31 diagonally downward to the side boundary frame portions 24 of the planar spring deck 20 so that the ends of the leg portions 32 are fixed to the side boundary frame portions 24, respectively. The top portion 31 is positioned forward and upward from the front boundary frame portion 22.

The side protruding spring frames 40 protrude outwardly upwards and sideways from the side boundary frame portions 24 of the planar spring deck 20, respectively. Each side protruding spring frame 40 is connected at its rear end to the rear end of the corresponding side boundary frame portion 24. The connections between the rear portions of the side protrusions and the boundary frame could be arranged and configured such that at least one of the side protruding spring frames extends along the rear boundary frame to enhance the rigidity of the rear boundary frame, thus substantially preventing bending and/or deformation of the rear boundary frame. Alternatively, the side protrusions and the rear boundary frame can be made of one integral member bent or formed in the desired shape (not shown). In this alternative, the rigidity of the integral member, at least between the side boundary frame portions, should be equivalent to the rigidity of a hard-drawn steel wire having a diameter of at least about 5 mm. Each side protruding spring frame is connected at its front portion to the corresponding end of the top portion 31 of the front protruding spring frame 30.

As in Embodiment 1, the frame components of the seating surface supporting framework 2, that is, the rectangular boundary frame 21, the front protruding spring frame 30 and the side protruding spring frames 40, are each formed of a wire, such as a hard-drawn steel wire, having a diameter of 2–8 mm and predetermined elasticity and rigidity. The rigidity thereof is greater than that of the spring wires 25 of the planar spring deck 20. To form the seating surface supporting spring framework 2, the frame components may be separately formed, or neighboring frame components may be formed together by bending a single wire. The frame components or neighboring frame component units are connected by welding or by using connecting clamps as in Embodiment 1. Further, as in Embodiment 1, the front boundary frame portion 22, the rear boundary frame portion 23 and the side boundary frame portions 24 of the rectangular boundary frame 21 may be formed of wires having the same diameter or different diameters.

Figure 5:
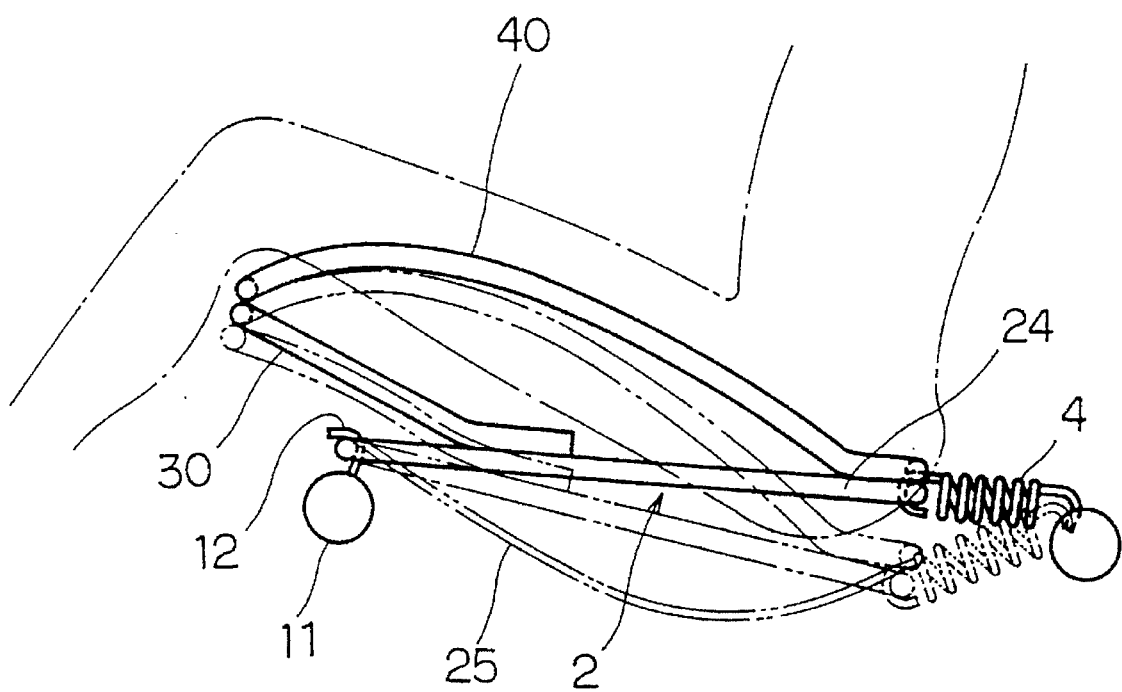
FIG. 5 is a schematic side view of Embodiment 2 with an illustration of an occupant, illustrating how a seating surface supporting spring framework yields when receiving load from the occupant.

As shown in FIG. 5 when a person sits on a seat comprising the above-described seat cushion pad supporting construction and a cushion pad laid over the planar spring deck 20, the seating surface supporting spring framework 2 practically pivots downward about the front boundary frame portion 22 with the spring steel wires 25 curved downward as indicated by the two-dot lines, thus achieving substantially the same advantages as achieved by Embodiment 1.

In addition, when a load is exerted on a front edge portion of the seat cushion, for example, when a driver sitting on the seat performs a pedaling operation so that the driver's upper leg presses the front edge portion, the front protruding spring frame 30 disposed under a front edge portion of the cushion pad yields downward, thus providing cushioning performance and substantially eliminating bottom-hitting events during pedal operation, that is, events in which the driver's upper leg presses the edge portion of the cushion pad substantially to its cushioning limit.

Furthermore, the side protruding spring frames 40 firmly support the occupant's body during, for example, cornering. Because the side protruding spring frames 40 are connected to the front protruding spring frame 30 and the side boundary frame portions 24 of the rectangular boundary frame 21, the side protruding spring frames 40 do not excessively yield, nor does the front protruding spring frame 30. Although the load is transmitted from the side protruding spring frames 40 to the rectangular boundary frame 21, the side boundary frame portions 24 serve as braces to prevent excessive deformation of the planar spring deck 20, thus providing a substantially stable seating surface.

Figure 6:
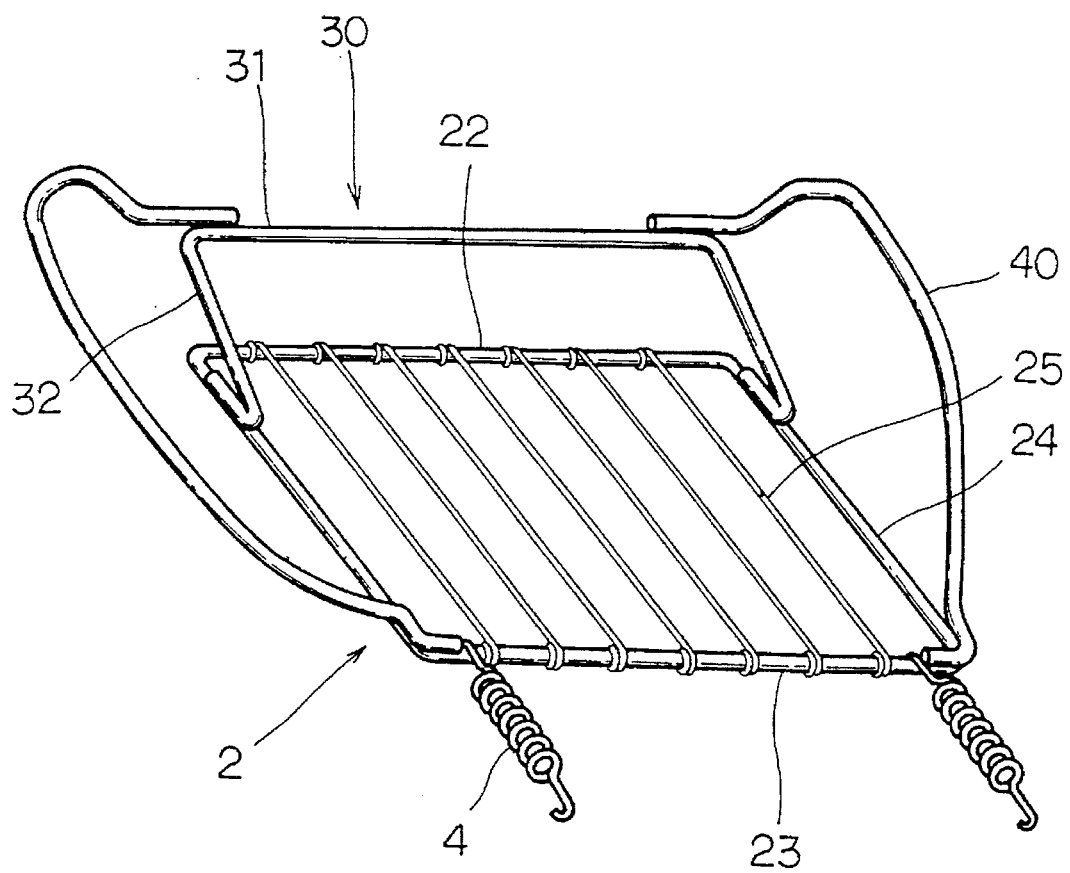
FIG. 6 illustrates a modification of front and side protruding frame portions according to Embodiment 2.
Figure 7:
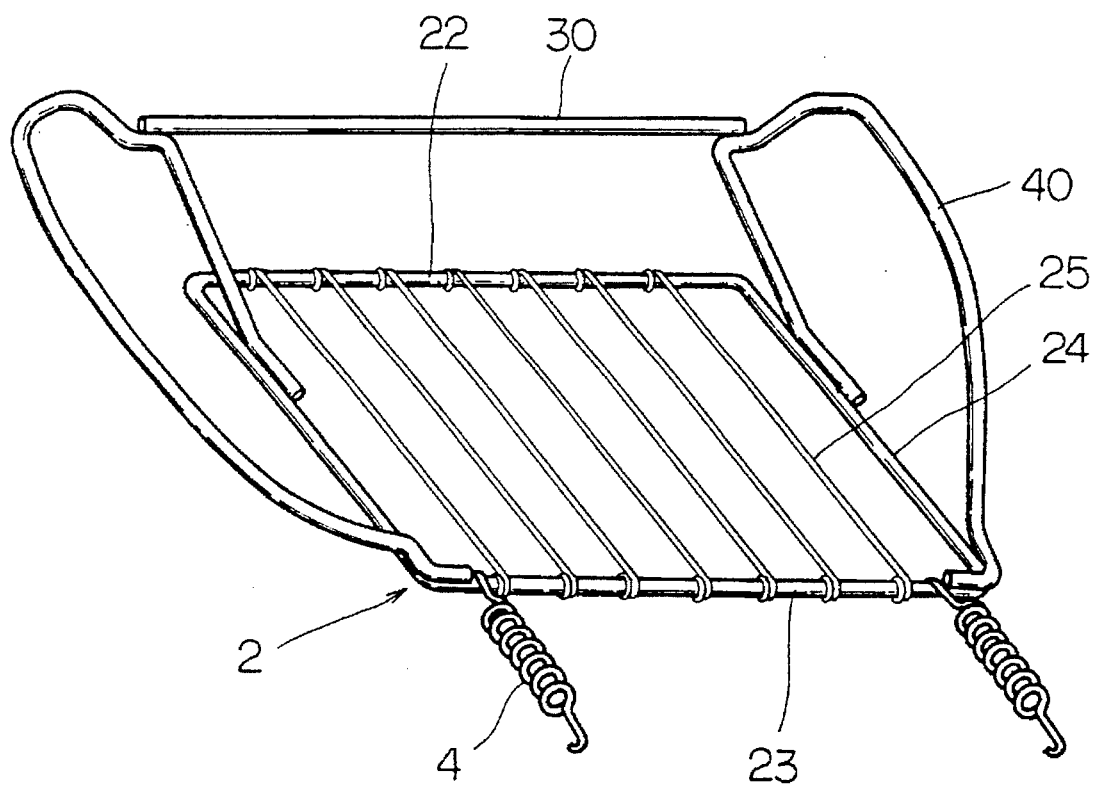
FIG. 7 illustrates another modification of the protruding frame portions according to Embodiment 2.

As shown in FIGS. 6 and 7, the front protruding spring frame 30 and the side protruding spring frames 40 may be formed and connected to each other or to the rectangular boundary frame 21 in various manners. Referring to FIG. 6, end portions of the leg portions 32 of the front protruding spring frame 30 are acutely bent forward and connected to the side boundary frame portions 22 while the corresponding portions in the construction as shown in FIGS. 4 and 5 extend rearward. Referring to FIG. 7, each side protruding spring frame 40 has a front leg portion extending diagonally downward and rearward and connected at its end to the corresponding side boundary frame portion 24. The front protruding spring frame 30 does not have leg portions but is connected at its ends to the side protruding spring frames 40.

Embodiment 3

Embodiment 3 of the present invention will be described with reference to FIGS. 8 to 14.

Figure 8:
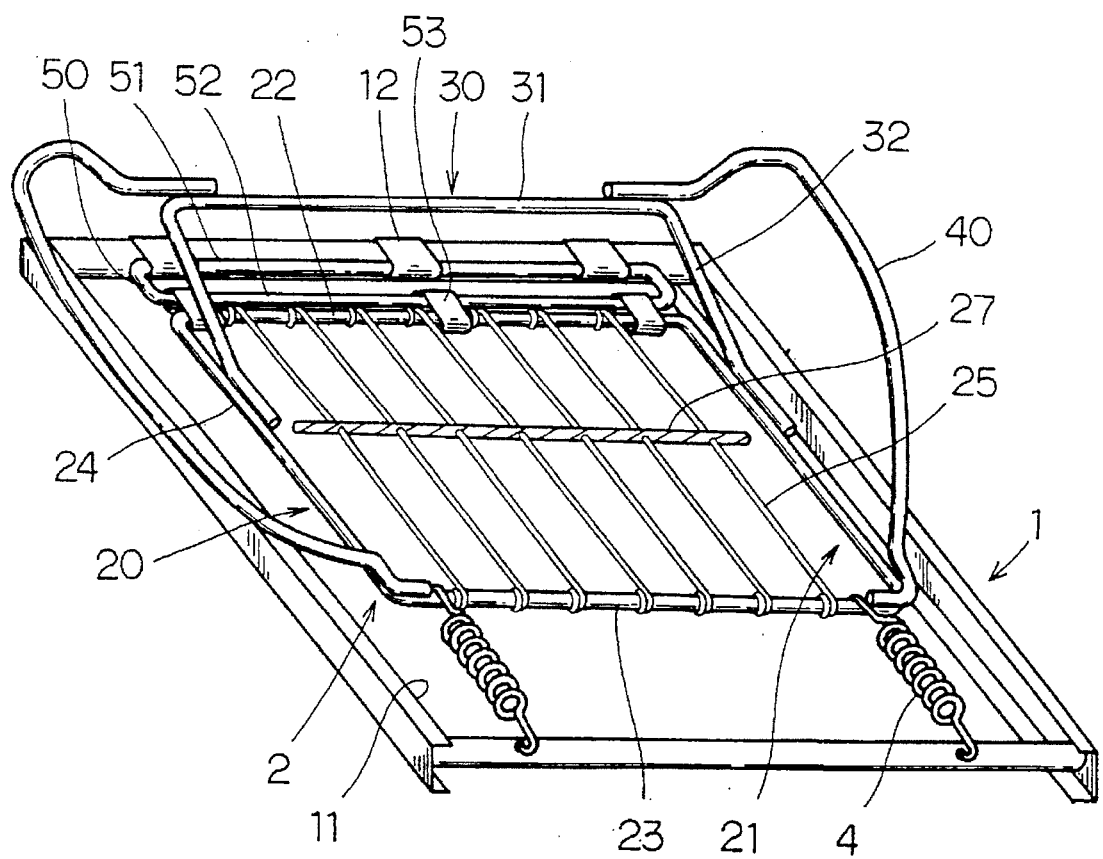
FIG. 8 is a perspective view of Embodiment 3 of the seat cushion pad supporting construction of the present invention.

Referring to FIG. 8, this embodiment is constructed substantially in the same manner as Embodiment 2, except that a seat cushion pad supporting construction according to Embodiment 3 further comprises a pivotable linking member 50 that is pivotably connected at its rear end to the front boundary frame portion 22 of the seating surface supporting spring framework 2, and pivotably connected at its front end to a front portion of the seat cushion base frame 1 adjacent the opening 11.

As in Embodiment 2, the frame components of the seating surface supporting framework 2, that is, the rectangular boundary frame 21, the front protruding spring frame 30 and the side protruding spring frames 40, are each formed of a wire, such as a hard-drawn steel wire, having a diameter of 2–8 mm and predetermined elasticity and rigidity. The rigidity is greater than that of the spring steel wires 25 of the planar spring deck 20. To form the seating surface supporting spring framework 2, the frame components may be separately formed, or neighboring frame components may be formed together by bending a single wire. The frame components of neighboring frame component units are connected by welding or by using connecting clamps as in Embodiment 2. Further, as in Embodiment 2, the front boundary frame portion 22, the rear boundary frame portion 23 and the side boundary frame portions 24 of the rectangular boundary frame 21 may be formed of wires having different diameters.

The pivotable linking member 50 is a transversely-long, generally rectangular frame comprising a front shaft portion 51 and a rear shaft portion 52. The front shaft portion 51 is rotatably connected to connector members 12, such as hooks, which are rigidly connected to or formed in the front portion of the seat cushion base frame 1 adjacent the opening 11. The rear shaft portion 52 is rotatably connected to the front boundary frame portion 22 of the seating surface supporting spring framework 2 by other connector members 53. While the pivotable linking member 50 allows the side boundary frame portions 24 of the seating surface supporting spring framework 2 to vertically pivot relative to the connector members 12 of the front portion of the seat cushion base frame 1, it restricts the front boundary frame portions 22 of the seating surface supporting spring framework 2 from transversely shifting and rolling or twisting about a fore-to-aft axis relative to the seat cushion base frame 1. The seating surface supporting spring framework 2 is constantly urged rearward by tension springs 4 disposed between the rear boundary frame portion 23 and a rear portion of the seat cushion base frame 1 adjacent the opening 11.

Figure 9:
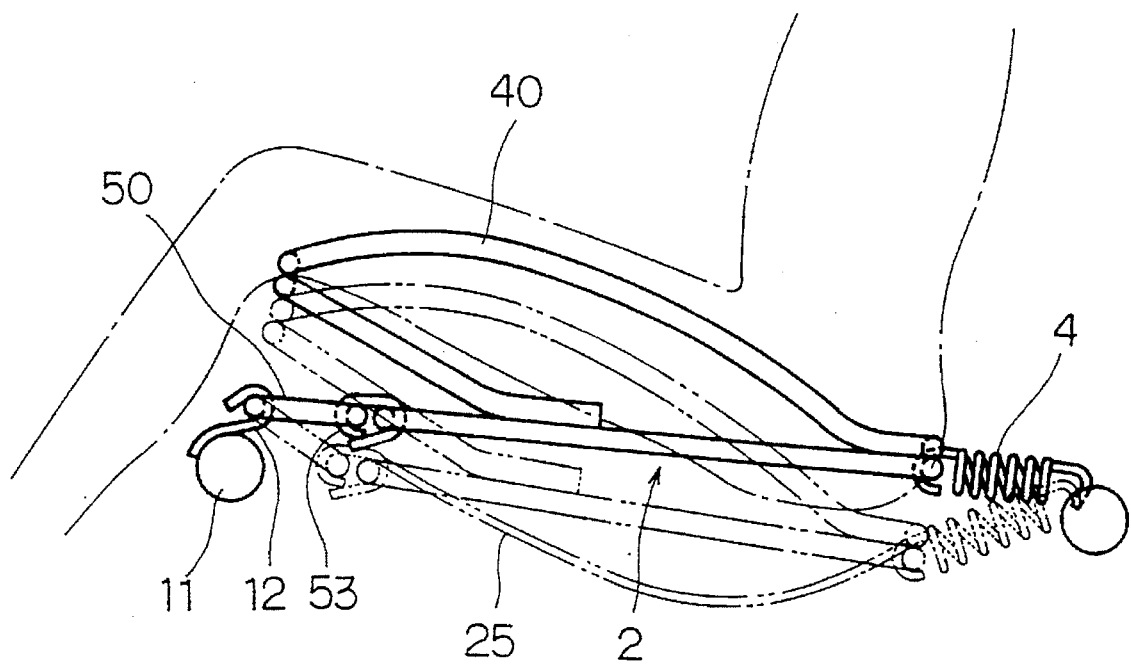
FIG. 9 is a schematic side view of Embodiment 3 with an illustration of an occupant, illustrating how the seating surface spring framework yields when receiving load from the occupant.

As shown in FIG. 9, when a person sits on a seat comprising the above-described seat cushion pad supporting construction as described above and a cushion pad laid over the planar spring deck 20, the linking member 50 pivots downward and the entire seating surface supporting framework 2 sinks relative to the seat cushion base frame 1 with the spring steel wires 25 curved downward as indicated by the two-dot lines, thus achieving substantially the same advantages as achieved by Embodiment 2.

Figure 10:
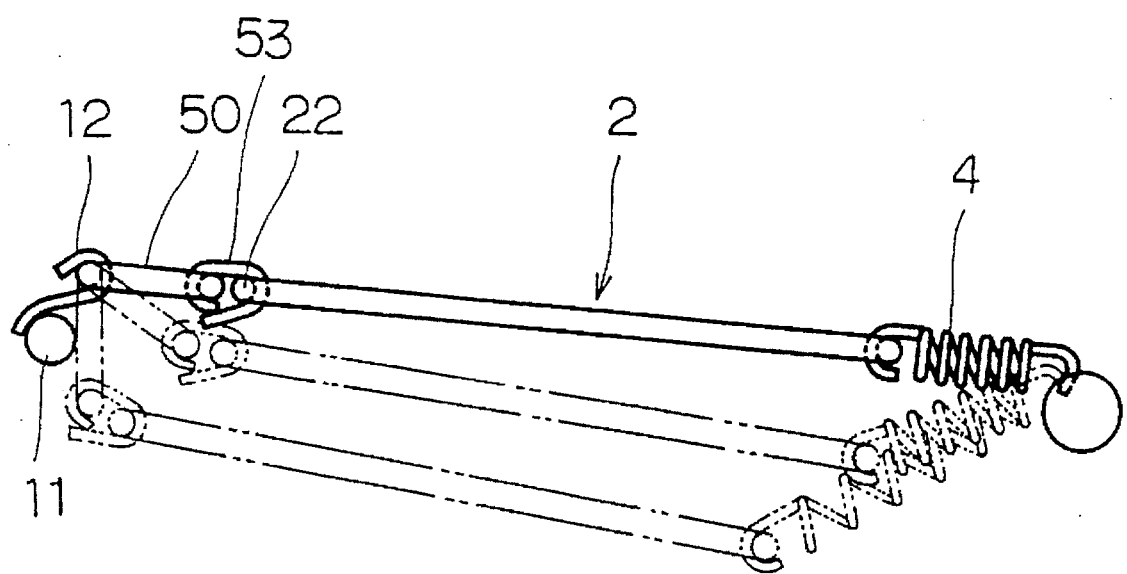
FIG. 10 is a schematic side view of Embodiment 3, illustrating how the seating surface supporting spring framework further yields when receiving additional load.

In response to a severe road shock jolting the occupant's body relative to the seat cushion base frame 1, the seating surface supporting spring framework 2 further sinks from the statically loaded position as indicated by the two-dot lines in FIG. 10 to a position as indicated by the one-dot lines in FIG. 10 while the linking member 50 further pivots downward and forward. Simultaneously, the tension springs 4 are further elongated, thereby appropriately restricting the downward and forward motions of the seating surface supporting spring framework 2 and the linking member 50. Thus, the seat cushion pad supporting construction according to this embodiment further improves the cushioning performance, thereby substantially eliminating bottom-hitting events even when receiving a severe road shock.

Furthermore, because the linking member 50 restricts the seating surface supporting spring framework 2 from shifting in the right-to-left directions and because the side boundary frame portions 24 prevent the planar spring deck 20 from excessively deforming, a stable seating surface is achieved. In addition, because the linking member 50 considerably restricts the fore-to-aft motions of the seating surface supporting spring framework 2, at most within the range determined by the pivoting of the linking member 50, the fore-to-aft shifting of the seating surface is minimized.

Figure 11:
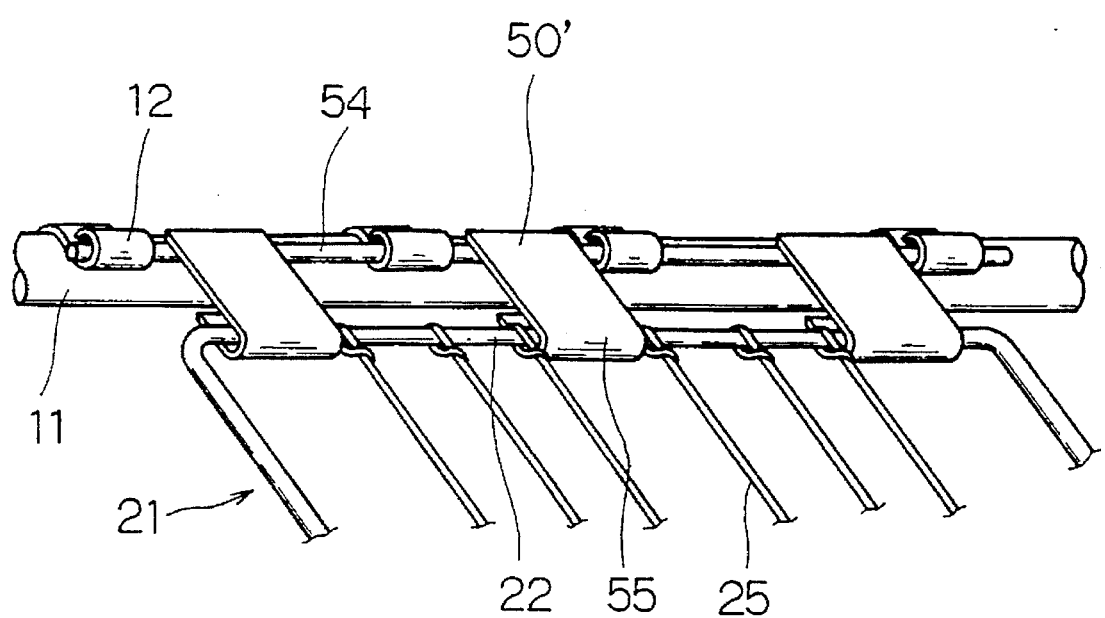
FIG. 11 is a fragmentary perspective view of Embodiment 3, illustrating a modification of a pivotable linking mechanism.
Figure 12:
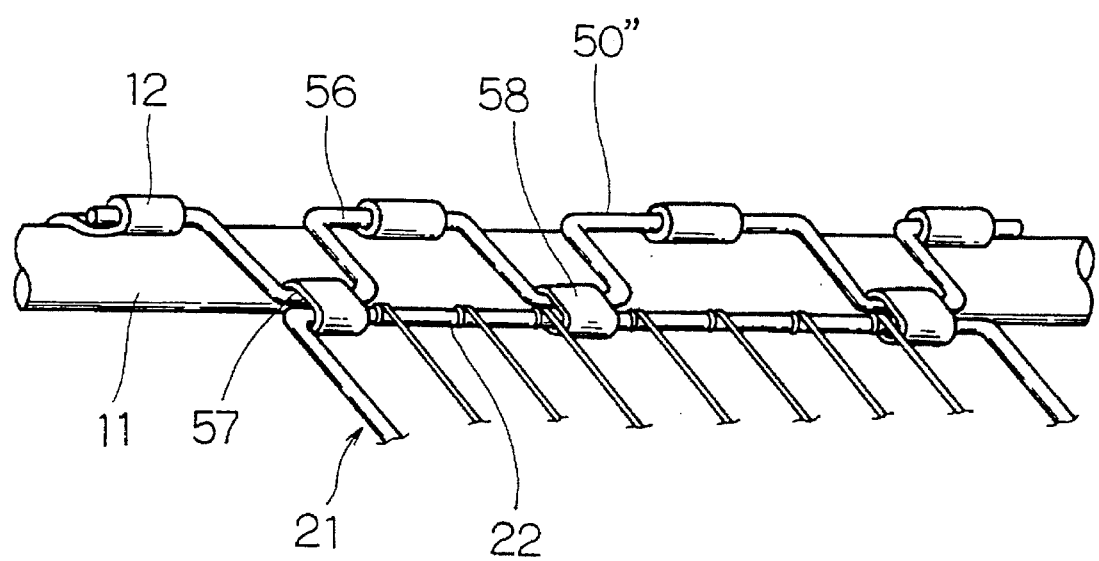
FIG. 12 illustrates another modification of the pivotable linking mechanism according to Embodiment 3.

Embodiment 3 may employ a variety of the pivotable linking mechanisms, for example, as shown in FIGS. 11 and 12, as long as the mechanisms allow the front boundary frame portion 22 to vertically pivot with respect to the front portion of the seat cushion base frame 1 and restrict the front boundary frame portion 22 from shifting right to left and rolling about an fore-to-aft axis.

The pivotable linking mechanism shown in FIG. 11 employs a plurality of linking plates 50' and a linear shaft 54 rotatably connected to connector members 12 that are fixed to or formed together with a front portion of the seat cushion base frame 1 adjacent the opening 11. The linking plates 50' are spaced apart along the linear shaft 54 and connected at their front ends to the linear shaft 54. Each linking plate 50' has, at its a rear end portion, a bearing portion 55 to which the front boundary frame portion 22 is rotatably connected. Instead of the linking plates 50', the linking mechanism may employ a single transversely elongated linking plate having front protruding end portions and rear bearing portions. In addition, the linear shaft 54 may be omitted if a linking plate has a slot for receiving a connector member 12.

The linking mechanism shown in FIG. 12 employs a crank shaft 50" having front shaft portions 56 and rear shaft portions 57. Each front shaft portion 56 is rotatably connected to a connector member 12 that is fixed to or formed together with a front portion of the seat cushion base frame 1 adjacent the opening 11. Each rear shaft portion 57 is rotatably connected to the front boundary frame portion 22 by another connector member 58.

Figure 13:
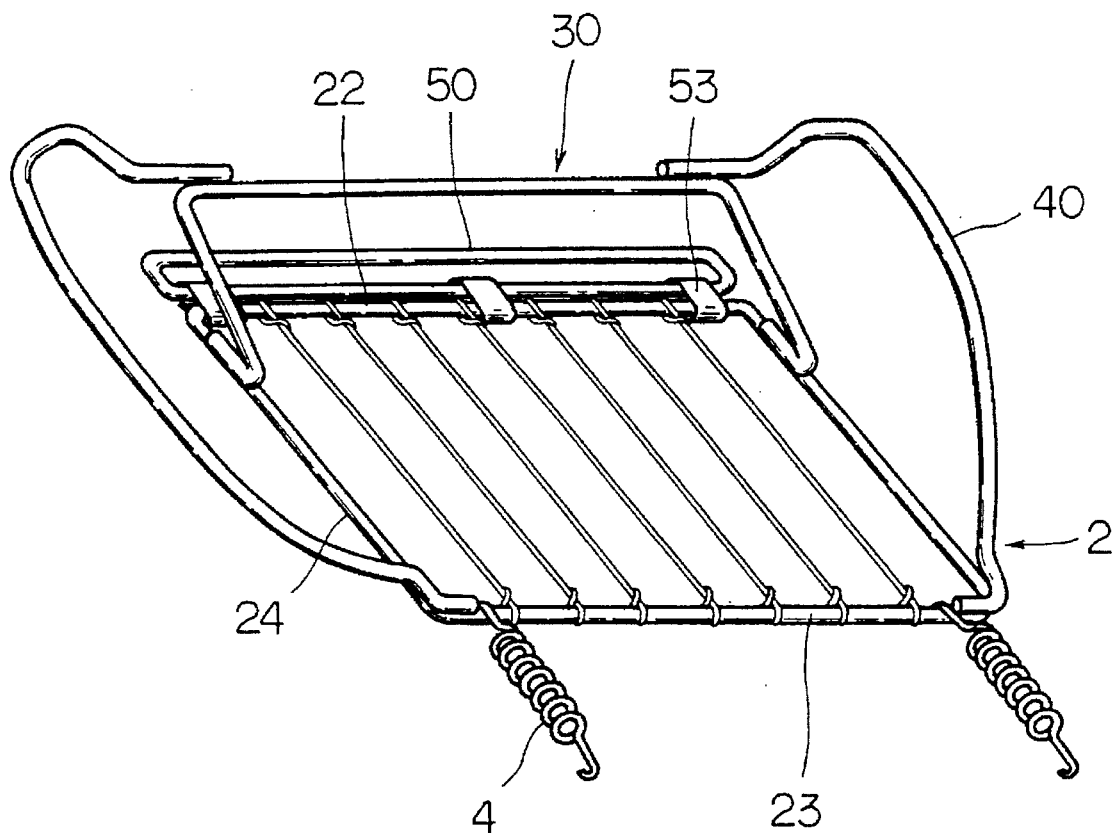
FIG. 13 illustrates a modification of front and side protruding frame portions according to Embodiment 3.
Figure 14:
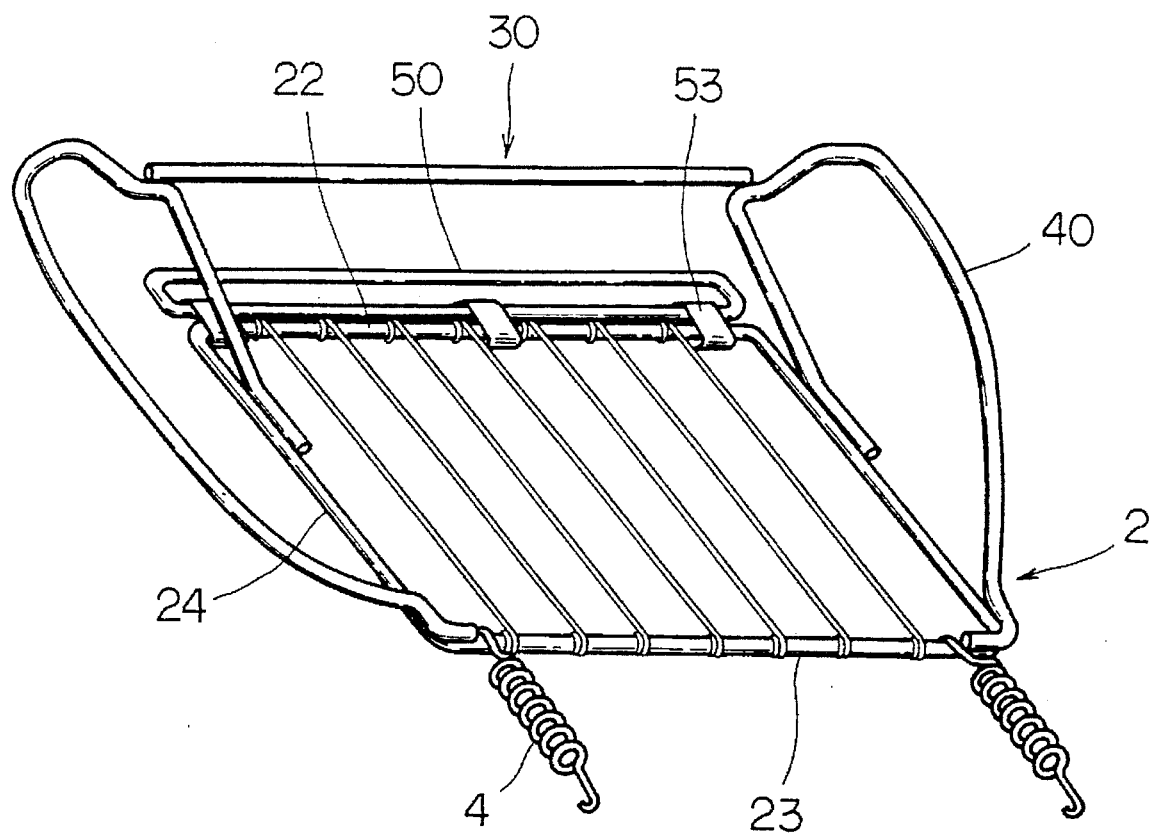
FIG. 14 illustrates another modification of the protruding frame portions according to Embodiment 3.

Similarly to Embodiment 2, the front protruding spring frame 30 and the side protruding spring frames 40 according to Embodiment 3 may be formed and connected to each other or to the rectangular boundary frame 21 in various manners, for example, as shown in FIGS. 13 and 14. Because the front protruding spring frame 30 and the side protruding spring frames 40 shown in FIGS. 13 and 14 are generally the same as those shown in FIGS. 6 and 7, respectively, the description thereof will be omitted.

Modifications of Seating Surface Supporting Spring Framework

Figure 15:
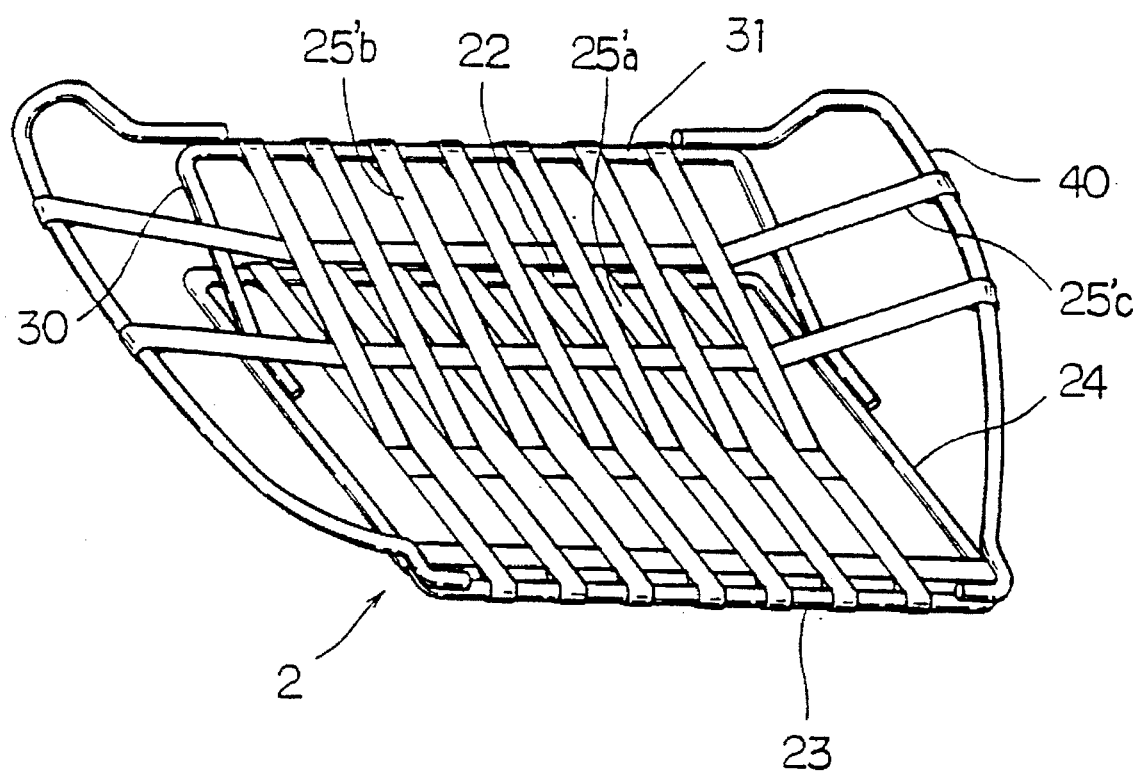
FIG. 15 illustrates a modification of the seating surface supporting spring framework according to the invention, employing band-like planar flexible members instead of spring steel wires.
Figure 16:
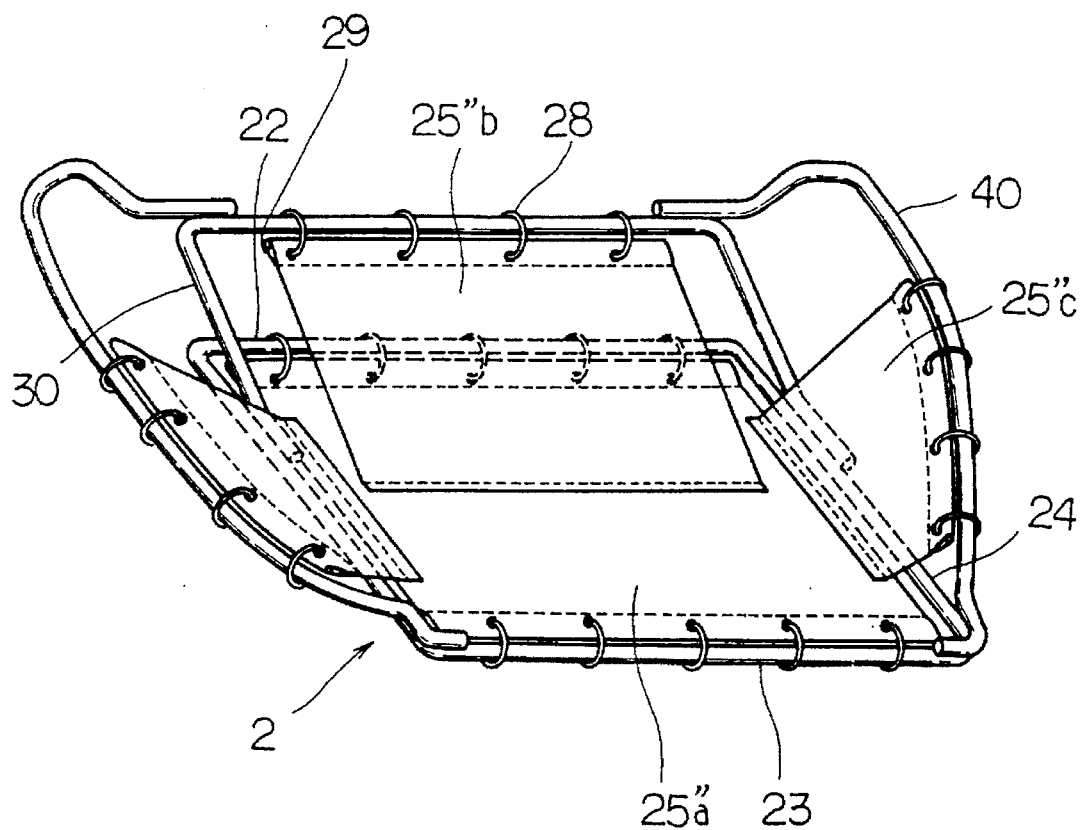
FIG. 16 illustrates another modification of the seating surface supporting spring framework according to the invention, employing wide planar flexible members instead of spring steel wires.

According to the present invention, the seating surface spring framework 2 may employ, instead of spring steel wires 25, flexible members as the flexible supporter members, as shown in FIGS. 15 and 16.

Referring to FIG. 15, a plurality of flexible band-like planar members 25'a made of, for example, synthetic resin, rubber or fabric, are each connected at one of its ends to the front boundary frame portion 22 and at the other end to the rear boundary frame portion 23. The flexible band-like planar members 25'a simply extend or are stretched therebetween in fore-to-aft directions. Further, similar band-like planar members 25'b are each connected at one of its ends to the top portion 31 of the front protruding spring frame 30 and fixed at the other end to an intermediate portion of the corresponding band-like planar members 25'a that are remote from both the front boundary frame portion 22 and the rear boundary frame portion 23. The band-like planar members 25'b simply extend or are stretched therebetween in a vertically diagonal fore-to-aft orientation. Furthermore, similar band-like planar members 25'c transversely extend beneath the band-like planar members 25'b and are connected at its ends to the side protruding spring frames 40. The transverse band-like planar members 25'c may be fixed to the band-like planar members 25'b at the intersections therewith, so as to maintain the spacing between the fore-to-aft extending band-like planar members 25'a. Diagonal portions of each transverse band-like planar member 25'c toward the side protruding spring frames 40 facilitate mounting a seat cushion pad (in addition to providing additional load support). The band-like flexible planar members may be replaced by cord-like flexible members. The diagonal band-like planar members 25'b are fixed to the longitudinal band-like planar members 25'a by, for example, thermal fusing or stitching. The band-like planar members 25'a, 25'b, 25'c are each connected to the boundary frame portions or the spring frames by, for example, a loop of an end portion of each planar member extending around the corresponding boundary frame portion or spring frame.

A modification as shown in FIG. 16 employs wider flexible planar members 25"a, 25"b and 25"c made of, for example, synthetic resin, rubber or fabric. The sheet-like planar member 25"a is connected to the front and rear boundary frame portions 22, 23 so as to substantially cover the opening of the boundary frame 21. The sheet-like planar member 25"b is connected at its front end to the top portion 31 of the front protruding spring frame 30 and fixed by, for example, thermal fusing or stitching at its rear end to an intermediate portion of the sheet-like planar members 25"b remote from the front and rear boundary frame portion 22 and 23. The sheet-like planar members 25"c are each connected to a lateral end portion of the sheet-like planar member 25"a and the adjacent side protruding spring frame 40 to facilitate mounting a seat cushion pad. The sheet-like planar members 25"a, 25"b, 25"c may be stretched in substantially fore-to-aft directions by providing pre-tension.

As shown in FIG. 16, hooks or clamps 28 may be used to substantially rigidly connect the sheet-like planar members, 25"a, 25"'b, 25"c to the boundary frame portions and to the protruding spring frames. Further, a reinforcing rod member 29, such as a wire, may be enveloped in the edge portion of each sheet-like planar member in order to support the clamps 28.

In the above modifications, the planar members 25'a and 25"a connected to the front and rear boundary frame portions 22 and 23 respectively achieve substantially the same advantages of the spring steel wires 25, and further improve the cushioning performance of the planar spring deck 20 so as to enable use of a thinner seat cushion pad. In addition, the planar members 25'b and 25"b respectively improve the supporting and cushioning performance with respect to the upper legs of an occupant.

Other Modifications

Although the preferred embodiments have been described in connection with the component frames of the seating surface supporting framework 2, that is, the rectangular boundary frame 21, the front protruding spring frame 30 and the side protruding spring frames 40, which are formed of wires having circular sectional shapes, the frame components may be formed of other types of material, for example, a flat steel rod or a steel pipe having a circular sectional shape, a rectangular sectional shape or the like, as long as the material has elasticity and rigidity required.

Although the above embodiments each comprise two tension springs 4, more than two tension springs may be provided. For example, another tension spring may be provided to connect a middle portion of the rear boundary frame portion 23 to the seat cushion base frame 1. Furthermore, the tension springs 4 may have different spring constants. In addition, the tension springs may be replaced by other resilient members such as rubber bands.

In addition, although the spring decks of embodiments 2 and 3 of the invention are shown as a continuous member, the spring deck of embodiment 1 can be substituted for the spring decks of embodiments 2 and 3.

While the present invention has been described with reference to preferred embodiments thereof, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A seat cushion pad supporting construction comprising:
a seat cushion base frame having an opening;
a generally planer spring deck comprising a boundary frame and flexible support means disposed substantially over the opening, said flexible support means being connected between a front portion of the seat cushion pad supporting construction and a rear boundary frame portion of the boundary frame, said rear boundary frame portion having a rigidity such that the rear boundary frame portion substantially resists deformation during application of a load, wherein the rear boundary frame portion of the boundary frame includes means for providing greater rigidity to the boundary frame than other portions of the boundary frame;
non-resilient connecting means for non-resiliently connecting the front boundary frame portion of the boundary frame to a front portion of the seat cushion base frame adjacent the opening to substantially prevent the front boundary frame portion of the boundary frame from moving at least in right-to-left directions and rolling about axes extending substantially in the fore-to-aft directions and up-and-down directions relative to the seat cushion base frame; and
resilient connecting means for resiliently connecting the rear boundary frame portion of the boundary frame to a rear portion of the seat cushion base frame adjacent the opening so that at least a rear portion of the planer spring deck is shiftable substantially in said up-and-down directions.

2. The seat cushion pad supporting construction according to claim 1, wherein the rear boundary frame portion of the boundary frame is a separate member that is connected to other boundary frame portions of the boundary frame.

3. The seat cushion pad supporting construction according to claim 1, wherein the non-resilient connecting means includes means for allowing the spring deck to pivot substantially vertically about the front portion of the seat cushion base frame.

4. The seat cushion pad supporting construction according to claim 1, wherein the resilient connecting means includes a tension spring.

5. The seat cushion pad supporting construction according to claim 1, wherein the planar spring deck further comprises a spacer member transversely extending across and connected to the flexible support means.

6. The seat cushion pad supporting construction according to claim 1, wherein the flexible support means includes a plurality of spring steel wires connected to the front boundary frame portion and to the rear boundary frame portion of the boundary frame.

7. The seat cushion pad supporting construction according to claim 1, wherein the flexible support means includes at least one flexible member made of resin and connected to the front boundary frame portion and the rear boundary frame portion of the boundary frame.

8. The seat cushion pad supporting construction according to claim 1, wherein the flexible support means includes at least one flexible member made of fabric and connected to the front boundary frame portion and the rear boundary frame portion of the boundary frame.

9. The seat cushion pad supporting construction according to claim 1, further comprising a front protruding spring frame extending from the boundary frame of the planar spring deck, the front protruding spring frame having a top portion positioned upward from the front boundary frame portion of the boundary frame.

10. The seat cushion pad supporting construction according to claim 9, wherein the flexible support means includes at least one first flexible member connected to the front boundary frame portion and the rear boundary frame portion of the boundary frame and at least one second flexible member connected to the top portion of the front protruding spring frame and an intermediate portion of said at least one first flexible member.

11. The seat cushion pad supporting construction according to claim 1, further comprising side protruding spring frames extending from the boundary frame, each of the side protruding spring frames having a portion positioned outwardly upwards and sideways from respective ones of said side boundary frame portions of the boundary frame.

12. The seat cushion pad supporting construction according to claim 11, wherein the flexible support means includes at least one flexible member connected to the front boundary frame portion and to the rear boundary frame portion of the boundary frame, and wherein the seat cushion pad supporting construction further comprises at least one flexible pad support connected to one of the side protruding spring frames and the flexible support means.

13. The seat cushion pad supporting construction according to claim 1, further comprising protruding spring frame means extending from the boundary frame of the planar spring deck, the protruding spring frame means including a front protruding spring frame having a top portion positioned upward from the front boundary frame portion of the boundary frame and side protruding spring frames each having a portion positioned outwardly upwards and sideways from respective ones of said side boundary frame portions of the boundary frame.

14. The seat cushion pad supporting construction according to claim 13, wherein the flexible support means includes at least one first flexible member connected to the front boundary frame portion and the rear boundary frame portion of the boundary frame, and at least one second flexible member connected to the top portion of the front protruding spring frame and an intermediate portion of said at least one first flexible member, and wherein the seat cushion pad supporting construction further comprises at least one flexible pad support connected to one of the side protruding spring frames and the flexible support means.

15. The seat cushion pad supporting construction according to claim 13, wherein the front spring frame is connected to forward portions of the side spring frames.

16. The seat cushion pad supporting construction according to claim 1, wherein the non-resilient connecting means includes linking means pivotably connected to the front portion of the cushion seat base frame and the front boundary frame portion of the boundary frame, whereby the front boundary frame portion is substantially vertically pivotable with respect to the front portion of the seat cushion base frame adjacent the opening and wherein the resilient connecting means urges the planar spring deck rearward.

17. The seat cushion pad supporting construction according to claim 16, further comprising a front protruding spring frame extending from the boundary frame of the planar spring deck, the front protruding spring frame having a top portion positioned upward from the front boundary frame portion of the boundary frame.

18. The seat cushion pad supporting construction according to claim 17, wherein the flexible support means includes at least one first flexible member connected to the front boundary frame portion and the rear boundary frame portion of the boundary frame, and at least one second flexible member connected to the top portion of the front protruding spring frame and an intermediate portion of said at least one first flexible member.

19. The seat cushion pad supporting construction according to claim 16, further comprising side protruding spring frames extending from the boundary frame, each of the side protruding spring frames having a portion positioned outwardly upwards and sideways from respective ones of said side boundary frame portions of the boundary frame.

20. The seat cushion pad supporting construction according to claim 19, wherein the flexible support means includes at least one flexible member connected to the front boundary frame portion and the rear boundary frame portion of the boundary frame, and wherein the seat cushion pad supporting construction further comprises at least one flexible pad support connected to one of the side protruding spring frames and the flexible support means.

21. The seat cushion pad supporting construction according to claim 16, further comprising protruding spring frame means extending from the boundary frame of the planar spring deck, the protruding spring frame means including a front protruding spring frame having a top portion positioned upward from the front boundary frame portion of the boundary frame and side protruding spring frames each having a portion positioned outwardly upwards and sideways from respective ones of said side boundary frame portions of the boundary frame.

22. The seat cushion pad supporting construction according to claim 21, wherein the flexible support means includes at least one first flexible member connected to the front boundary frame portion and the rear boundary frame portion of the boundary frame and at least one second flexible member connected to the top portion of the front protruding spring frame and to an intermediate portion of said at least one first planar flexible member, and wherein the seat cushion pad supporting construction further comprises at least one planar flexible pad support connected to one of the side protruding spring frames and to the flexible support means.

23. The seat cushion pad supporting construction according to claim 21, wherein the front spring frame is connected to forward portions of the side spring frames.

24. A seat cushion support comprising:

a base frame having an opening;

a generally planar spring deck having flexible support members connected to front and rear frame portions of a spring deck boundary frame, said front and rear frame portions being connected to side frame portions, said rear frame portion being connected to said front and side frame portions of the spring deck boundary frame and having a greater rigidity than said front and side frame portions of the spring deck boundary frame;

wherein said spring deck is connected to the base frame such that the spring deck can be pivoted about the front frame portion while substantially preventing the boundary frame from relative lateral movement and twisting about fore-to-aft and up-and-down axes with respect to the base frame.

25. The cushion support according to claim 24, wherein said rigidity of said rear frame portion is equivalent to a rigidity of a hard-drawn steel wire having a diameter of at least about 5 mm.

26. A support structure for a seat cushion, comprising:

an outer frame;

a generally planar inner frame having at least one frame portion pivotably connected to a front portion of said outer frame, a rear frame portion mounted for movement substantially up-and-down with respect to a rear portion of said outer frame, and side frame portions connecting said at least one frame portion and said rear frame portion; and support members connected to said rear frame portion and a front portion of said support structure;

wherein said rear frame portion is a steel wire having a first diameter, and said at least one frame portion is a steel wire having a second diameter that is smaller than the first diameter, whereby said rear frame portion is substantially prevented from deformation during application of a load.

27. The support structure according to claim 26, wherein said means for substantially preventing deformation comprises providing said rear frame portion with a rigidity that is equivalent to a rigidity of a hard-drawn steel wire having a diameter of at least about 5 mm.

28. The support structure according to claim 26, wherein said rear frame portion comprises a hard-drawn steel wire having a diameter of at least about 5 mm.

\* \* \* \* \*